United States Patent [19]

Onagi

[11] Patent Number: 5,452,273
[45] Date of Patent: Sep. 19, 1995

[54] OPTICAL RECORDING METHOD AND APPARATUS THEREFOR

[75] Inventor: Nobuaki Onagi, Tsurugashima, Japan

[73] Assignee: Pioneer Electronic Corporation, Tokyo, Japan

[21] Appl. No.: 356,052

[22] Filed: Dec. 14, 1994

Related U.S. Application Data

[63] Continuation of Ser. No. 129,574, Sep. 29, 1993, abandoned, which is a continuation of Ser. No. 868,168, Apr. 14, 1992, abandoned.

[51] Int. Cl.$^6$ ............................................. G11B 7/00
[52] U.S. Cl. ........................................ 369/13; 360/59
[58] Field of Search ................ 369/275.3, 44.38, 13, 369/44.37, 109, 110, 44.14; 360/59

[56] References Cited

U.S. PATENT DOCUMENTS

| | | | |
|---|---|---|---|
| 4,549,287 | 10/1985 | Hatano et al. | 369/13 |
| 4,853,912 | 8/1989 | Akasaka et al. | 369/13 |
| 5,191,563 | 3/1993 | Lee et al. | 369/13 |
| 5,199,022 | 3/1993 | Suzuki et al. | 360/59 |

FOREIGN PATENT DOCUMENTS

| | | | |
|---|---|---|---|
| 10383386 | 8/1990 | European Pat. Off. | |
| 01112505 | 5/1989 | Japan | 369/13 |
| 04095201 | 3/1992 | Japan | 360/59 |

OTHER PUBLICATIONS

Japanese Patent Abstract JP3263637.
Japanese Patent Abstract JP3062326.
Japanese Patent Abstract JP3225637.
Japanese Patent Abstract JP2177027.

*Primary Examiner*—Scott J. Sugarman
*Assistant Examiner*—P. W. Huber
*Attorney, Agent, or Firm*—Fish & Richardson

[57] ABSTRACT

Method and apparatus for recording information on an overwritable optical disk in which data is recorded on the disk with a writing beam spot while shifting the writing beam spot in a radial direction by a pitch smaller than the diameter of the writing beam spot for each rotation of the disk. In a reading operation, a reading beam having a shorter wavelength than that of the writing beam is used to read recorded data.

9 Claims, 2 Drawing Sheets

OPTICAL RECORDING METHOD AND APPARATUS THEREFOR

This application is a file wrapper continuation of U.S. application Ser. No. 08/129,574, filed Sep. 29, 1993, which is a file wrapper continuation of U.S. application Ser. No. 07/868,168, filed Apr. 14, 1992, both now abandoned.

BACKGROUND OF THE INVENTION

1. Field of the Invention

The present invention relates to a method for recording information on an optical recording medium, and more particularly, to method and apparatus for recording information on an overwritable optical disk.

2. Description of Background Information

The recording density of an optical disk can be increased by reducing the diameter of the spot of a light beam to be irradiated on a recording surface. Reducing of the spot diameter of the light beam in consideration of downsizing an apparatus requires a small and high-power solid-state laser device which generates short-wave light. However, since such a laser device cannot easily be obtained, it is difficult to sufficiently raise the recording density of an optical disk.

If information is recorded on, for example, a magneto optical disk as an optical disk by modulating the magnetic field, simultaneous erasing of recorded information and recording of new information, so-called overwriting, is possible. For such an overwritable optical disk, by setting the data transfer rate at the time of data writing at a value higher than the rotational speed of the disk, the bit length of recording tracks formed on the recording surface of the disk can be made shorter than the spot diameter of a light beam, ensuring easy increase of the recording density along the beam's tracing direction irrespective of the diameter of the light beam spot. Even with the rotational speed of the disk and the data transfer rate controlled, however, it is still difficult to sufficiently increase the recording density of an overwritable optical disk because the recording density in the radial direction of the disk depends on the diameter of the light beam spot.

OBJECT AND SUMMARY OF THE INVENTION

It is therefore an object of the present invention to provide an optical recording method and apparatus, which is free from the above-mentioned shortcomings, and allows a sufficient increase in the recording density.

Optical recording method and apparatus according to the present invention are characterized in that data is recorded on an optical disk overwritable with irradiation of a writing beam spot thereon, wherein the recording is performed while the writing beam spot is shifted in a radial direction by a pitch smaller than the diameter of the writing beam spot in a radial direction for each rotation of the disk.

According to the optical recording method and apparatus of the present invention, part of a data-recorded track is erased and new data is written there at the same time, so that the remaining area of that track excluding the overwritten part is available as a recording track. A recording track having a width narrower than the diameter of the writing beam spot is formed, making it possible to increase the recording density in the radial direction of the disk irrespective of the diameter of the writing beam spot.

DETAILED DESCRIPTION OF THE PREFERRED EMBODIMENT

Figure 1:
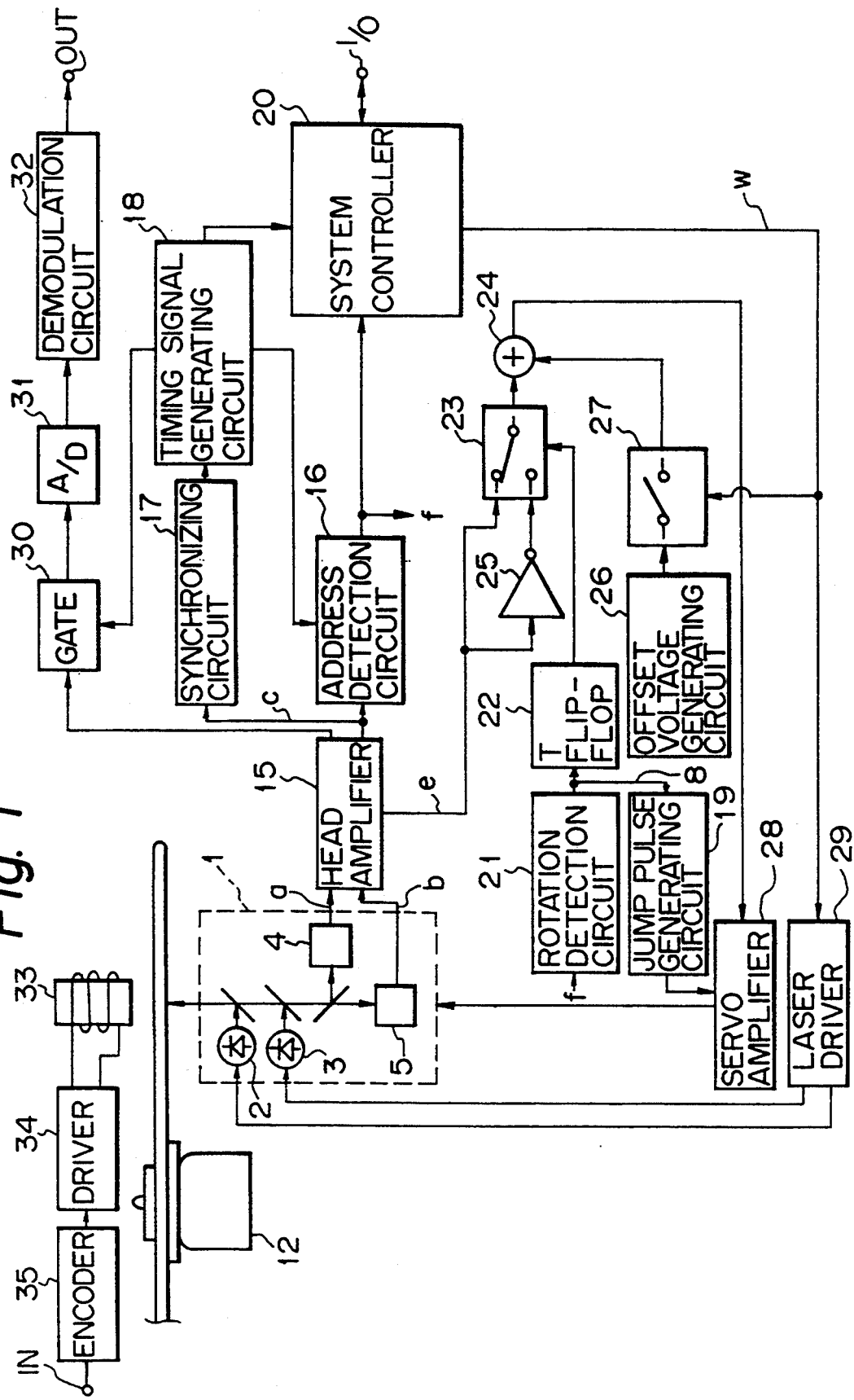
FIG. 1 is a block diagram illustrating one embodiment of the present invention.

A preferred embodiment of the present invention will now be described referring to the accompanying drawings. In a magneto optical disk player embodying the present invention shown in FIG. 1, an optical head 1 has a semiconductor laser 2 for a high-power writing beam, a semiconductor laser 3 for a low-power reading beam, and light-receiving elements 4 and 5 incorporated therein. The semiconductor laser 2 generates long-wave light while the semiconductor laser 3 generates short-wave light. The light-receiving elements 4 and 5 receive light beams from both channels of a differential optical system and perform photoelectric conversion of the light beams. The light-receiving elements 4 and 5, each divided into four, detects laser beam generated from the semiconductor laser 3 and reflected at the recording surface of a magneto optical disk 10 as an optical disk, through respective analyser. One of the light-receiving elements detects the positive directional component of a Kerr rotational angle, and the other the negative directional component of the Kerr rotational angle.

On the recording surface of the disk 10, grooves and lands with equal widths are previously formed concentrically or in a spiral form. Recording tracks to be formed on the grooves or lands on the disk 10 are divided into a plurality of sectors. Each sector is divided into a header area where preaddress pits including address information or the like are previously formed and a data area where data can be recorded by magneto-optical recording. This disk 10 is rotated at a predetermined speed by a motor 12 under the control of a spindle servo circuit (not shown).

Outputs a and b of the light-receiving elements 4 and 5 are supplied to a head amplifier 15. The head amplifier 15 is designed to produce a sum signal c which is acquired by adding the outputs a and b of both light-receiving elements and a difference signal d which is acquired by subtracting the output a or b from the other, as well as a tracking error signal e by the push-pull method, for example, and a focus error signal by the astigmatic method. The sum signal c from the head amplifier 15 serves to provide address information previously recorded as preaddress pits. The difference signal d serves to provide magneto-optically recorded information.

The sum signal c is supplied to an address detection circuit 16 and a synchronizing circuit 17. The synchronizing circuit 17 is designed to produce a sync signal synchronous with the reading of sectors, by using a portion of the sum signal c corresponding to the preaddress pits. This sync signal from the synchronizing circuit 17 is supplied to a timing signal generating circuit 18, which is designed to produce various timing signals on the basis of the sync signal. The address detection circuit 16 is designed to demodulate a portion of the sum signal c corresponding to the preaddress pits in response to the timing signal from the timing signal generating circuit 18 to produce data including address information such as a track number, sector number and so on. The output data, f, of the address detection circuit 16 is supplied to a system controller 20 and a rotation detection circuit 21.

The system controller 20 is constituted of a microcomputer which comprises a processor, ROM, RAM, etc. The system controller 20 receives various instructions from an external device via an input/output terminal I/O. The processor of the system controller 20 controls the individual sections according to a program stored in advance in the ROM and exchanges a control signal with an external device for data exchange therewith via the input/output terminal I/O.

The rotation detection circuit 21 is designed to produce a rotation detection pulse p based on the address information from the address detection circuit 16 for each rotation of the disk 10. The rotation detection pulse p is supplied to a jump pulse generating circuit 19 and also to a trigger input terminal of a T flip-flop 22. This jump pulse generating circuit 19 generates a jump pulse over a predetermined period of time from the instant of generation of the rotation detection pulse p.

The Q output of the T flip-flop 22 is supplied to a control input terminal of a change-over switch 23. The change-over switch 23 has one input terminal directly supplied with the tracking error signal e from the head amplifier 15 and the other input terminal supplied with the tracking error signal e after passing through an inversion amplifier 25. The change-over switch 23 selectively outputs the tracking error signal e, for example, when the control input is at a low level, and selectively outputs the tracking error signal e whose polarity has been inverted by the inversion amplifier 25 when the control input is at a high level. The output of the change-over switch 23 becomes one input to an adder 24. An offset voltage g output from an offset voltage generating circuit 26 is supplied via a switch circuit 27 to the adder 24 as the other input. The output of this adder 24 is supplied via a servo amplifier 28 as a drive signal to a tracking actuator incorporated in the head 1. Consequently, when the offset voltage g is not added to the tracking error signal e, the tracking control is executed in such a way that the light beam spot to be formed on the recording surface of the disk 10 moves on the grooves or lands previously formed on the recording surface.

The servo amplifier 28 also receives the jump pulse from the jump pulse generating circuit 19. This servo amplifier 28 is designed to drive the tracking actuator to jump the light beam spot on the recording surface of the disk 10 in response to the jump pulse to jump outward by a distance equal to the width of each groove or land previously formed on the recording surface. The switch circuit 27 is designed to be turned on only in write mode by a write command signal w output from the system controller 20. The write command signal w becomes high, for example, in writing time, and is supplied to the switch circuit 27 and a laser driver 29. The laser driver 29 selectively drives the semiconductor laser 2 in write mode in response to the write command signal w, and selectively drives the semiconductor laser 3 in reading time.

The difference signal d is supplied to a gate circuit 30 comprising an analog switch, etc. This gate circuit 30 is designed to pass only portions of the difference signal d corresponding to the data area in response to the timing signal from the timing signal generating circuit 18. The output of the gate circuit 30 is converted by an A/D converter 31 into a digital signal. This digital signal is then supplied to a demodulation circuit 32 comprising a 4/15 demodulator to be demodulated. The output data of the demodulation circuit 32 is supplied as reproduced data to an output terminal OUT.

A magnetic head 33 comprising an electromagnetic coil for applying a magnetic field to the disk 10 is disposed opposite the optical head 1 with the disk 10 in between. The magnetic head 33 is supplied with a drive current from a magnetic head driver 34; the direction of the drive current is determined based on the output of an encoder 35. The encoder 35 comprises a 4/15 modulator for modulating the input signal so that the signal is directly writable on the disk.

With the above arrangement, when writing of data is performed, the system controller 20 outputs the write command signal w. Then, the semiconductor laser 2 is selectively driven and the switch 27 is turned on at the same time, thereby adding the offset voltage g to the tracking error signal e. Let us now assume that the spot diameter of the writing beam emanating from the semiconductor laser 2 is twice the width of the groove or lands, that the tracking control is effected so as to move the center of the writing beam spot on the center line of a land when the tracking error signal e is directly output selectively from the change-over switch 23, and that the polarity and magnitude of the offset voltage g are so determined that, when the offset voltage g is added to the tracking error signal e, the center position of the writing beam spot is shifted outward by ½ of the width of the grooves or lands.

Figure 2:
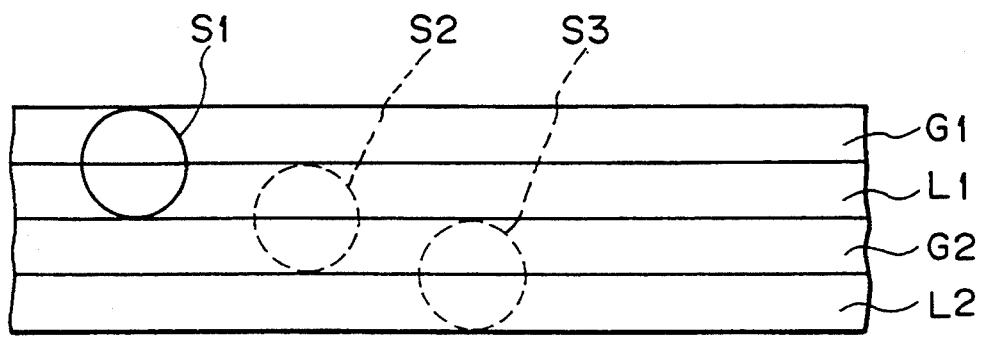
FIG. 2 is a diagram showing the locus of a writing beam spot that moves on the recording surface of a disk 10.

Then, the tracking control is executed so that the center of a writing beam spot S1 moves on the boundary between a groove G1 and a land L1 previously formed on the recording surface of the disk 10, as shown in FIG. 2. When the disk 10 makes one turn, the rotation detection circuit 21 outputs the rotation detection pulse p. Consequently, the jump pulse is produced so that the center of the writing beam spot moves outward by a distance equal to the width of the land L1 and the T flip-flop 22 is inverted at the same time to allow the change-over switch 23 to selectively output the tracking error signal e whose polarity has been inverted. Then, the tracking control is so effected as to move the center of the writing beam spot on the boundary between the land L1 and a groove G2 as indicated by a dashed line L2. As a result, the writing beam spot is irradiated on the land L1 and groove G2 simultaneously. On the land L1 on which data has already been written, data will be written by magnetic field modulation system, enabling data overwriting so that new data is written while the already-written data is erased. At this time, no writing beam spot is irradiated on the groove G1, permitting the data already written in the groove G1 to stay as its was. Consequently, a recording track with the width narrower than the diameter of the writing beam spot is formed in the groove G1.

When the disk 10 makes another single turn, the rotation detection circuit 21 outputs the rotation detection pulse p again. As the jump pulse is produced as mentioned above, the center of the writing beam spot moves outward by a distance equal to the width of the groove G2 and the T flip-flop 22 is inverted at the same time to allow the change-over switch 23 to selectively output the tracking error signal e directly. Then, the tracking control is so effected as to move the center of the writing beam spot on the boundary between the groove G2 and a land L2 as indicated by a dashed line S3. As a result, new data is written in the groove G2 and on the land L2 while a recording track with the width narrower than the diameter of the writing beam spot is formed on the land L1.

Read-out of data is performed by a reading beam generated from the semiconductor laser 3. Since the wavelength of the reading beam emanating from the semiconductor laser 3 is shorter than that of the writing beam, the diameter of the reading beam spot to be formed on the recording surface of the disk 10 can be made equal to the width of the lands or grooves. With the use of this reading beam spot, data can be read out desirably from a recording track that has been formed on the recording surface of the disk 10 and its width is narrower than the diameter of the writing beam spot.

While the foregoing description has been given with reference to the case where a magneto optical disk is used as an optical disk, the present invention is also applicable to other types of optical disks as long as they are of an overwritable type.

Although the tracking control is effected by a push-pull method in the above embodiment, it may be executed using another system, such as a sampled servo system, with the same effect of forming a narrow recording track on a disk.

In short, the optical recording method according to the present invention are characterized in that information is recorded on an optical disk overwritable with irradiation of a writing beam spot thereon, while shifting the writing beam spot in a redial direction by a pitch smaller than the diameter of the writing beam spot for each rotation of the disk.

According to the optical recording method of the present invention, part of a data-recorded track is erased and new data is written there at the same time, so that the remaining area of that track excluding the overwritten part is available as a recording track. A recording track with the width narrower than the diameter of the writing beam spot is formed, making it possible to increase the recording density in the radial direction of the disk irrespective of the diameter of the writing beam spot, thereby sufficiently improving the overall recording density.

What is claimed is:

1. An optical recording method for recording data on an optical disc using a writing beam of a predetermined diameter, comprising the steps of:
   rotating said optical disc while writing data thereon with said writing beam at a first radial position;
   shifting said writing beam in a radial direction to a second radial position by a distance less than the diameter of the writing beam; and
   writing data on the disc using said writing beam at said second radial position immediately adjacent the data written at said first radial position, wherein the data written when said writing beam is at said second radial position overwrites a portion of the data written when said writing beam is at said first radial position.

2. An optical recording method as claimed in claim 1, wherein said distance is equal to one half the diameter of the writing beam.

3. An optical recording method as claimed in claim 1, wherein the writing beam is shifted from the first radial position to the second radial position after one full rotation of the optical disk.

4. An optical recording method for recording data on an optical disc using a writing beam of a predetermined diameter, comprising the steps of:
   rotating said optical disc while writing data thereon with said writing beam at a first radial position;
   shifting said writing beam in a radial direction to a second radial position by a distance less than the diameter of the writing beam;
   writing data on the disc using said writing beam at said second radial position immediately adjacent the data written at said first radial position, wherein the data written when said writing beam is at said second radial position overwrites a portion of the data written when said writing beam is at said first radial position; and
   reading data recorded on said optical disc using a reading beam having a shorter wavelength than that of the writing beam.

5. An optical recording method as claimed in claim 4, wherein said distance is equal to one half the diameter of the writing beam.

6. An optical recording method as claimed in claim 4, wherein the writing beam is shifted from the first radial position to the second radial position after one full rotation of the optical disk.

7. An optical recording apparatus for recording data on an optical disc using a writing beam of a predetermined diameter, comprising:
   means for rotating the optical disc;
   means for generating the writing beam;
   moving means for moving said writing beam in a radial direction with respect to the optical disc; and
   control means for controlling said moving means such that data is recorded on the optical disc using the writing beam at a first radial position and a second radial position immediately adjacent said first radial position, wherein said first and second radial positions are separated by a distance less than the diameter of the writing beam such that the data recorded when the writing beam is at the second radial position overwrites a portion of the data recorded when the writing beam is at the first radial position.

8. An optical recording apparatus as claimed in claim 7, wherein said distance is equal to one half the diameter of the writing beam.

9. An optical recording apparatus as claimed in claim 7, wherein the writing beam is shifted from the first radial position to the second radial position after one full rotation of the optical disk.

* * * * *